United States Patent [19]

Salacuse

[11] Patent Number: 4,527,760
[45] Date of Patent: Jul. 9, 1985

[54] ADJUSTABLE CLIP SYSTEM

[75] Inventor: Frank Salacuse, New York, N.Y.

[73] Assignee: Super Glue Corporation, Ridgewood, N.Y.

[21] Appl. No.: 508,966

[22] Filed: Jun. 29, 1983

[51] Int. Cl.$^3$ .............................................. B65D 35/56
[52] U.S. Cl. ...................................... 248/108; 24/590; 248/222.3
[58] Field of Search .................... 248/73, 222.3, 316.7, 248/113, 110, 108; 24/590, 573, 484; 403/343, 348

[56] References Cited

U.S. PATENT DOCUMENTS

| | | | |
|---|---|---|---|
| 3,180,606 | 4/1965 | Sabin et al. | 248/73 |
| 3,420,482 | 1/1969 | Taylor | 248/222.3 |
| 3,531,834 | 10/1970 | Weman | 24/573 |
| 3,860,209 | 1/1975 | Strecker | 24/590 |
| 4,223,861 | 9/1980 | Guggemos et al. | 248/222.3 |
| 4,240,604 | 12/1980 | Brach | 248/316.7 |
| 4,295,618 | 10/1981 | Morota et al. | 248/73 |
| 4,400,856 | 8/1983 | Tseng | 24/590 |

Primary Examiner—William H. Schultz
Assistant Examiner—Ramon O. Ramirez
Attorney, Agent, or Firm—Paul J. Sutton

[57] ABSTRACT

The present invention provides a clip-on system for a multi-purpose, snap-clamp device capable of releasably holding objects in either vertical or horizontal alignments. The system allows a user to select a horizontal or vertical alignment for the snap-clamp device. The system includes a body fastened to a wall or the like and having a compartment with a front wall forming a central passage and two pairs of slots. A mounting member carrying the snap-clamp device on one side has a fastener on the other side. The fastener includes a shaft and two pairs of arms extending at right angles from the shaft. The slots in the front wall of the body receive the arms and the central passage mounts the shaft. The arms are wedged and where the mounting member is rotated the edge of the wedges, which extend slightly into the compartment, catch the inner surface of the front wall of the body and wedge the mounting member into a locked position. The arms can be rotated before insertion so that the clamp is aligned either vertically or horizontally and in opposite directions. The clamp device is aligned either at an angle relative to the mounting member or to the slots according to the embodiment selected.

4 Claims, 6 Drawing Figures

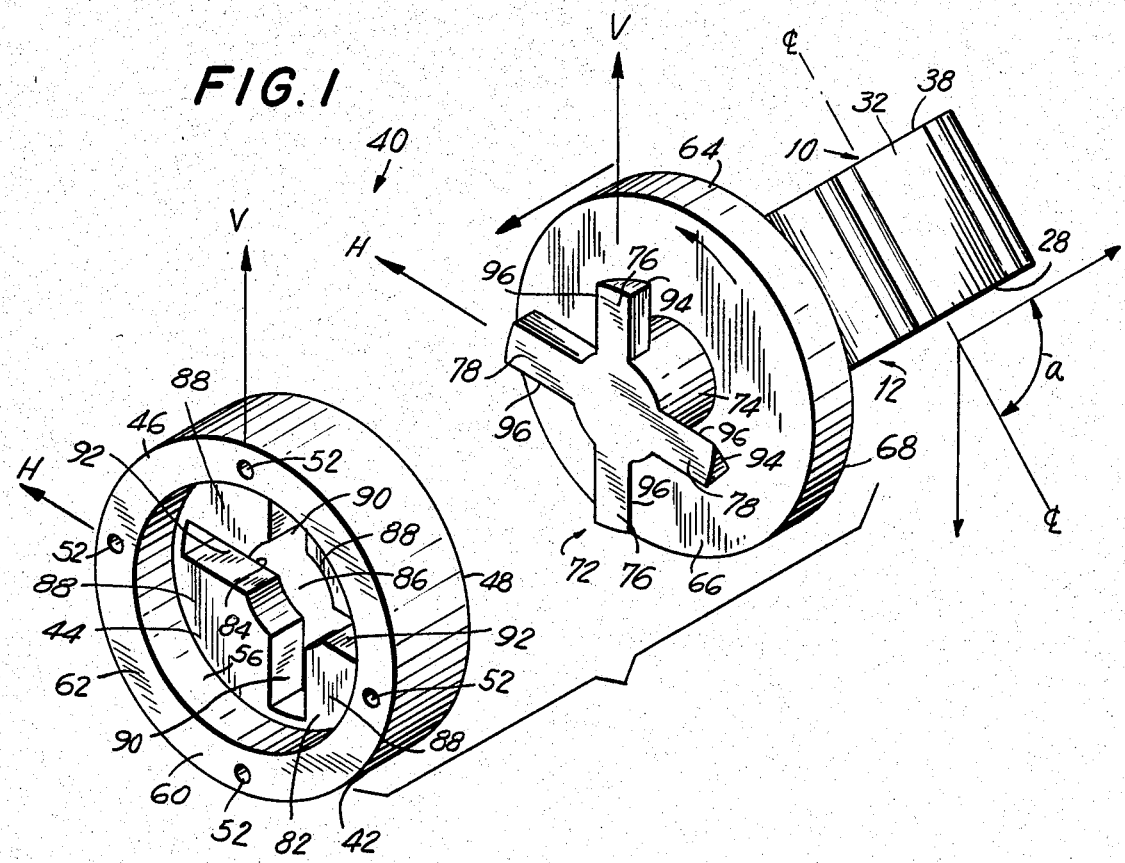

ADJUSTABLE CLIP SYSTEM

This invention relates generally to clip mounting systems and more particularly to a clip-on system for a multi-purpose, snap-clamp device capable of releasably holding objects.

U.S. Pat. No. 4,240,604 describes a clamping device having a snap-clamp part which is capable of releasably holding varied objects used in a household or a workshop. The device has a clamp which snaps open to an open position and snaps shut to a closed position. As described in U.S. Pat. No. 4,240,604, the device is permanently mounted with the clamps of the device in a horizontal alignment with the gripping space formed by the clamps oriented vertically. Thus, a toothbrush or other such object can be hung from the device through the gripping space when the clamp is closed. One of the clamps is provided with a handle extension, so that it is longer than the other, and when the clamp is open, the handle extension is configured as a hook. In this open position and when the clamps are oriented vertically, the device could be used as a hook. But U.S. Pat. No. 4,240,604 allows no such option.

It is therefore an object of the present invention to provide a multi-purpose, clip-on system that widens the applicability of the snap-clamp device described in U.S. Pat. No. 4,240,604.

It is another object of the present invention to provide a clip-on system that will allow the snap-clamp device to be mounted to a wall or the like at a selected vertical or horizontal alignment so that the snap-clamp device can be used to hang objects from either in the open position of the clamps as a hook on the closed position as a clamp with a gripping space.

It is yet a further object of this invention to provide a clip-on system for a snap-clamp device that includes a body attached to a wall or the like and a mounting member carrying a snap-clamp device wherein the mounting member can be mounted to the body in a selected vertical or horizontal alignment of the snap-clamp device.

It is a further object of this invention to provide a clip-on system including a mounting member carrying a snap-clamp device and a fastener capable of heavy selectively locked to a mounting body connected to a wall or the like.

It is still another object of the present invention to provide a clip-on system carrying a snap-clamp device and a fastener having two pairs of appropriately positional arms extending outwardly from an outlet connected to the mounting member.

It is yet another object of the present invention to provide a clip-on system carring a snap-clamp device and which has crossed arms at the end of a shaft that can be inserted into slots at a selected vertical or horizontal alignment central passage in the front wall of a body connected to a wall or the like, the mounting member being rotatable so that the arm rotates in a compartment in the body and lock against the inner surface of the front wall.

It is still another object of this invention to provide a clip-on system carrying a snap-clamp device and a fastener including crossed arms connected to the end of a shaft connected to the mounting member, the arms having tapered walls with edges that grip the inner wall of a front wall of a compartment of a body connected to a wall or the like so that when the mounting member is rotated, the tapered wall press against the inner surface of the front wall of the body and draw the mounting body into a locked position with said body.

In accordance with the the above and other objects a clip-on system, or mounting apparatus, for a snap-clamp device capable of releasably holding objects is provided that will allow the snap-clamp device to be selectively mounted in opposite vertical alignments and opposite horizontal alignments so that objects can either be held in the closed clamps of the device through the gripping space created between the closed clamps or be held by one of the ends of the clamps in the open position when the clamps are vertically aligned. Specifically, the mounting apparatus comprises a mounting body forming a compartment defined by side walls of the body, the side walls being preferably cylindrical and a front wall; a means for connecting the body to a generally vertical surface such as a wall and substantially parallel to the front wall; a snap-clamp device having opposed clamp means for holding objects when the clamps are closed and horizontally aligned, or oriented, or when the clamps are open to a hook configuration and are vertically aligned, a mounting member is abutting rotational relationship with the front wall, the mounted member being connected to said snap-clamp device; a fastener connected to said mounting member, the fastener including a shaft having opposed ends with one of the ends connected to and extending substantially perpendicular from a surface of the mounting member and two pairs of locking arms connected to the other of the ends of the shaft and extending substantially at right angles relative to the shaft, one of the pairs of arms being substantially at right angles relative to the other of the pairs of arms; and a means associated with the front wall of the compartment and the front wall for receiving and holding the fastener. The fastener is adapted to position the mounting member with the means for receiving and locking and further is adapted to position the mounted member and the snap-clamp device to said body in a locked position in selected vertical and horizontal alignments of the clamps of the snap-clamp device. The means for receiving and locking includes the front wall of the compartment forming a central passage substantially normal ti the inner and outer surfaces and further forming two pairs of slots connected to the central passage and adapted, with the central passage, to receive the two pairs of locking arms. Each of the four locking arms includes a tapered surface having an edge extending substantially at right angles relative fo the shaft. Each edge is rotationally aligned with the other following and succeeding edges.

This present invention will be more clearly understood from the following description of specific embodiments of the invention together with the accompanying drawings where similar reference characters denote similar elements throughout the several views and in which:

FIG. 1 is an exploded perspective view of the present invention prior to mounting with the snap-clamp device in a closed position.

FIG. 2 is a perspective view with the apparatus mounted to a wall and the snap-clamp device in an open position and with the clamps vertically aligned.

REFERENCE IS NOW MADE IN MORE DETAIL TO THE DRAWINGS

Figure 3:
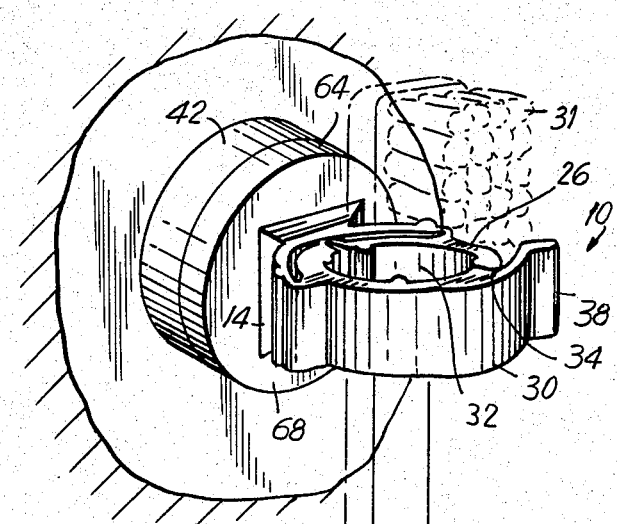
FIG. 3 is a perspective of the apparatus view with the snap-clamp device closed and the clamp horizontally aligned.

Before proceeding to a description of the embodiments of the present invention, a brief description will be made of the snap-clamp device described in detail in U.S. Pat. No. 4,240,604 which is to be mounted by the present invention.

Snap-clamp device 10 is shown in various views in FIGS. 1,2,3,4 and 6.

Snap-clamp device 10 is preferably injection molded in one piece from polypropylene. In brief, snap-clamp device 10 includes a bending spring 12 which is approximately semicircular in lateral cross-section and which is secured to mounting base 14 at the mid-portion of its lower, or outer, surface. Bending spring 12 terminates in two film-hinges 16 and 17, by which it is connected in one piece with two control levers 19 and 20. These control levers are interconnected by another film-hinge 22. Control lever 19 has an extension 24; together there forms a gripper 26, which in its cross-section is partly circular. Control lever 20 has an extension 28; together, these form a partly circular gripper 30.

Figure 4:
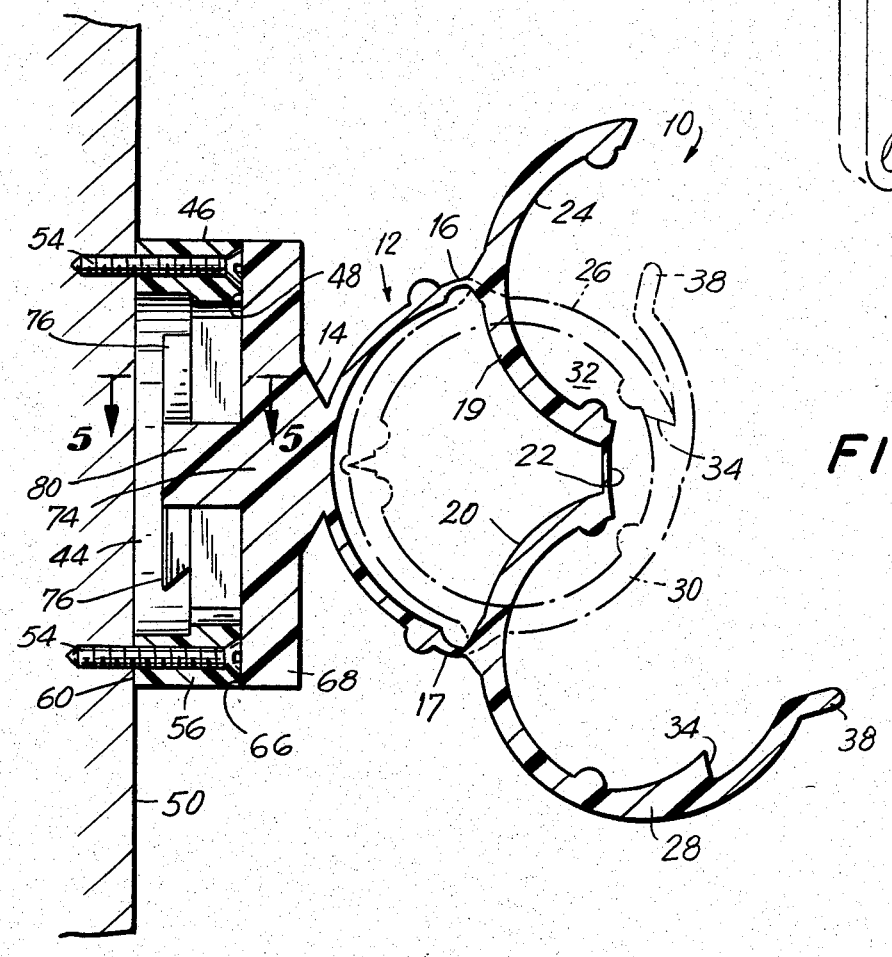
FIG. 4 is a sectional view taken through line 4—4 of FIG. 2.

Gripper 26 and gripper 30 together form a substantially cylindrical gripping space 32 when snap-clamp 10 is in the closed position, as shown best in phantom lines in FIG. 4. Control lever extension 28 terminates in a stop 34 at the end 36 of extension 24. Extension 24 is lengthened by a handle-extension 38 which may be used for opening the snap-clamp.

In the "closed" position, as shown in FIG. 1,3,6, and in phantom lines in FIG. 4, grippers 26 and 30 surround gripping space 32. Gripper 26 extends along an arc of less than 180° and gripper 30 along an arc of more than 180°.

Whenever snap-clamp 2 is to clasp an object, such as toothbrush 31 shown in phantom lines in FIG. 3, that fits in gripping space 32, the object is pressed axis-parallel against film hinge 22 so that the two control levers 19 and 20 are pressed against bending spring 12. The latter expands until finally its greatest width and thus the dead center of snap-clamp 10 has been reached. After that, bending spring 12 forces the two central levers 19 and 20 and thus grippers 26 and 30 into the closed position in which the object is clasped.

In order to open snap-clamp 12, the object may simply be torn out of snap-clamp 10 as a result of which snap-clamp 10 is forced into the reverse movement of that described so that grippers 26 and 30 separate and snap back into the "open" position, as shown in FIGS. 2 and 4. In lieu of the above, grip extension 38 may be moved and the open position attained and the object may be removed.

The sum of the distances between film hinge 22 and the outside film hinges 16 and 17 is greater than the distance between film hinges 16 and 17 in the case of a relaxed, or closed, spring mechanism that includes bending spring 12. That is, bending spring 12 is curved and control levers 19 and 20 fit into the open side of bending spring 12 in such a way that the sum of the distances between the middle film hinge 22 and the two outside film hinges 16 and 17 is only a little smaller than the uncoiled length of bending spring 12.

The above description should be enough to explain the construction and arrangement of snap-clamp device 10. It should be noticed that snap-clamp device 10 as a practical matter can be used in more than one basic position. Explicitly, gripper 30 may be positioned so that its axis runs approximately vertical, as shown in FIG. 3. This in fact is the position for which the description of its use in U.S. Pat. No. 4,240,604 would most obviously apply, wherein a toothbrush, for example, could be mounted. Another possible position, however, is, as shown in FIG. 2, when grippers 26 and 30 are in the open position. Here, lower gripper 30 along with extension 38 act as a hook from which to hang an object, such as keys, a small scissors and the like. In order to give the user an option to orient grippers 26 and 30 in any of four positions, and thus widen the multi-purpose applicability of the snap-clamp device invention, the present invention is set forth in detail below.

A mounting apparatus 40 is shown in an exploded perspective in FIG. 1. A substantially cylindrical body 42 forming an inner substantially cylindrical compartment 44 defined by cylindrical side wall 46 and vertical front wall 48. Body 42 is adapted to be mounted to a vertical surface 50 such as a wall, as shown in FIG. 2, where apparatus 40 is shown in a mounted position, namely, body 42 being connected to vertical surface 50, either by screws 54 through screwholes 52 extending horizontally through circumferential rim 56 into vertical surface 58, which can be, for example, a wall. Alternatively, rear surface 60 of rim 56, which is in contract with vertical surface 58, can be provided with an adhesive 62, which is indicated on FIG. 1 as dots.

Also shown in FIG. 1 and in accordance with the present invention is mounting member 64 shown in position ready to advance for attachment with body 42. Mounting member 64 is shown in the attached mode in FIG. 2. Mounting member 64 is preferably cylindrical in configuration with an outer diameter approximately equal to the outer diameter of preferably cylindrical body 42, so that the two are in alignment when joined together as seen in FIG. 2. Mounting member 64 includes first end surface 66 and opposed second end surface 68. In the mounted mode shown in FIG. 2, first end surface 66 is in rotatable abutting relationship with the outside surface of outer wall 48.

Snap-clamp device 10 is connected to second end surface 68 by means of mounting base 14 (seen in FIG. 2) at an angle a of approximately 45 degrees. This angle will be discussed below.

As illustrated in the embodiment of FIG. 1 a fastener 72 is mounted to first wall 66 for connection to front wall 48. Fastener 72 includes shaft 74 having one end connected to the center of first surface 66 and extended substantially normal to the first surface to a distance to be described. First pair of vertically oriented, oppositely positioned locking arms 76 are connected to the other end of shaft 74 and extend at right angles relative to the shaft. Likewise, second pair of oppositely positioned, horizontally oriented, locking arms 78 are also connected to the other end 86 of passage 74 and extend at right angles relative to the shaft. First pair of locking arms 76 and second pair of locking arms 78 are substantially at right angles one to another.

It is noted here that snap-clamp device 10, mounting member 64, and fastener 72 are all preferably of the same material, namely, the injection molded polypropylene described earlier in relation to device 10.

Front wall 48 of body 42 includes an inner surface 82 facing into compartment 44 and an opposing outer surface 84. Inner and outer surfaces 82 and 84 are both flat, vertical and substantially parallel. Front wall 48 forms a central passage normal to inner and outer surfaces 82 and 84. Central passage 86 is basically formed by four radically opposed curved support portions 88 of front wall 48 that define a substantially circular central passage 86, which is adapted to receive shaft 74. Front wall 48 also forms first and second pairs of oppositely positioned slots 90 and 92 of rectangular configuration adapted to receive first and second pairs of locking arms 76 and 78, respectively. Passage pairs 90 and 92 are connected to central passage 86 so that one aperture is formed.

Figure 5:
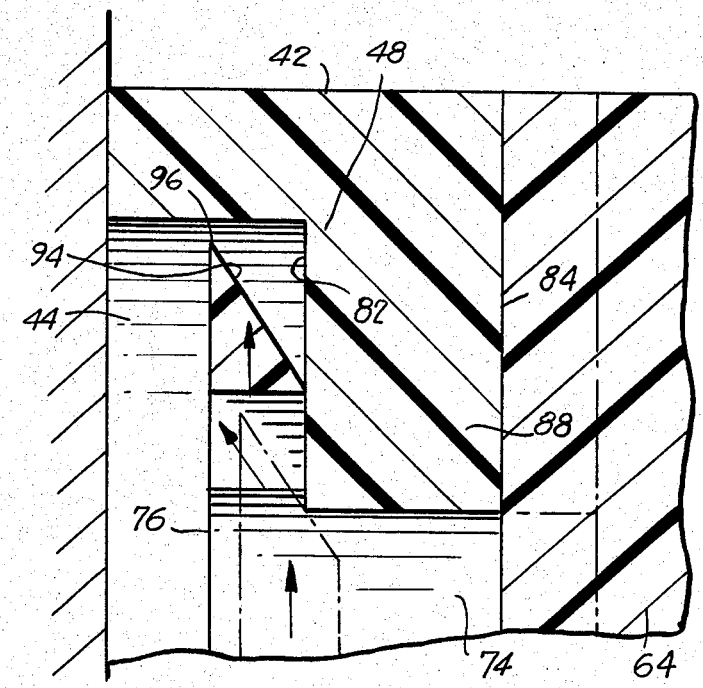
FIG. 5 is a detail sectional view taken through line 5—5 of FIG. 4.

Attention is now directed to first and second pairs of locking arms 76 and 78. As seen in FIG. 1, the portion of each arm facing front wall 48 is rectangular in configuration. Thus, slots 90 and 92 are able to receive paired arms 76 and 78. Each of the paired arms are tapered with a tapered surface 94 leading to an edge 96 that extends outwardly relative to shaft 74 to the end of the arm. Each edge 96 is rotatably aligned with the other, that is, when mounting member 64 is rotated in a clockwise direction and paired arms 76 and 78 are likewise rotated clockwise, each edge 96 follows the untapered side of the succeeding arm. The four support areas 88 adjoin each of the arms. When first and second paired locking arms 76 and 78 are inserted into the aperture formed by central passage 86 and paired slots 90 and 92, first wall 66 abuts front wall 48 at outer surface 84. Shaft 48 is of such a length that the four edges 96 of paired locking arms 76 and 78 extend slightly into compartment 44. This is the unlocked position of fastener 72. When mounting member 64 is rotated clockwise, edges 96 pass over inner surface 82 at support portions 88 and tapered surfaces 94 come into contact with portions 88 until the locked position of fastener 72 is reached. This position is illustrated in FIG. 4. FIG. 5 illustrates a detail of the wedge of one of the arms against inner surface 82 of a portion 88 of front wall 48, specifically showing edge 96 rotated past slot 90 and tapered surface 94 wedged against the edge of inner surface 82 at a support area 88. This action pulls mounting member 64 into pressing relationship with body 40, and fastener 72 holds mounting member 64 into the locked position.

In the embodiment of FIGS. 1 and 3, paired slots 90 and 92 are aligned vertically and horizontally. Snap-clamp device 10 is tilted at an angle a, preferably about 45 degrees relative to paired arms 76 and 78, as indicated at horizontal lines H and vertical line V and centerline CL of gripping space 32 (indicated by broken line). When entry of paired arms 76 and 78 is made to compartment 44 and mounting member 64 is rotated clockwise about 45 degrees until the locked position of fastener 72 is attained, snap-clamp device 10 is rotated to the upright position shown in FIGS. 2 and 4. Likewise, in order to attain the horizontal position of FIG. 3, mounting member 72 is turned counterclockwise over 90 degrees and then paired arms 76 and 78 are inserted into paired slots 90 and 92 respectively. Mounting member 64 is then rotated over an angle a, preferably about 45 degrees as stated, until the locked position of fastener 72 is attained and snap-clamp device 10 is positioned at the horizontal as in FIG. 3.

Figure 6:
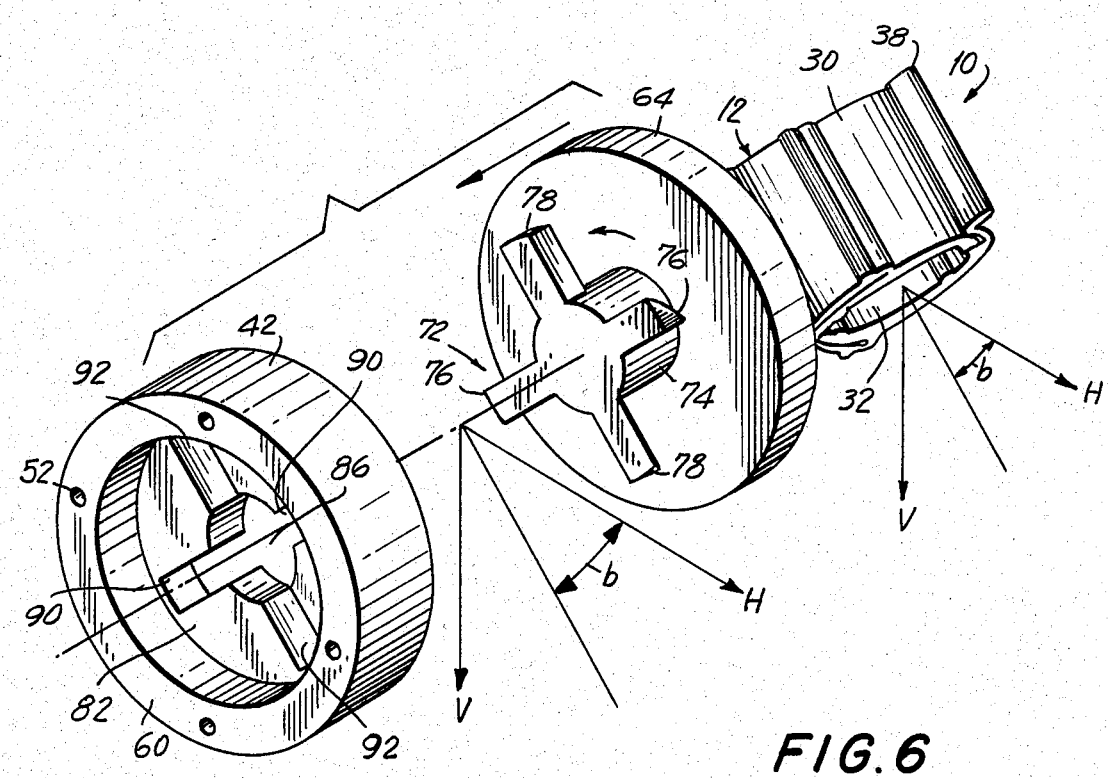
FIG. 6 is a exploded perspective view of an alternate embodiment of the present invention.

Another embodiment that is a variation of the embodiment of FIGS. 1,2,3 and 4 is shown in FIG. 6, where body 40 is mounted to a wall so that paired slots 90 and 92 are aligned at an angle b with the vertical V (or horizontal H) that is about 45 degrees. As seen in FIG. 6, snap-clamp 10 is positioned upward at the same alignment relative to vertical paired arms 76. When connection of mounting member 64 with body 40 is to be made, mounting member 64 is rotated at the angle b relative to the horizontal (or vertical) one way or the other (or b+90, 180 or 270 degrees) for entry into slots 90 and 92. When mounting member 64 is rotated at the angle b clockwise as shown in FIG. 6, and entry of fastener 72 through front wall 48 at slots 90 and 92 is made, and mounting member 64 is then rotated at the angle b so that snap-clamp device 10 reaches the vertical in the locked position, the same position shown in FIG. 2 is attained.

The embodiment of the invention particularly disclosed and described herein above is presented merely as an example of the invention. Other embodiments, forms and modifications of the invention coming within the proper shape and spirit of the appended claims will, of course, readily suggest themselves to those skilled in the art.

What is claimed is:

1. A multipurpose clip-on system including a device capable of releasably holding objects, in combination comprising:

a body forming a compartment defined by a side wall and a front wall secured to said side wall, means for connecting said body to a generally vertical surface opposed and substantially parallel to said front wall, a snap-clamp device having opposed clamp means for holding objects in either vertical or horizontal alignments of said clamp means, mounting member means in abutting rotational relationship with said front wall and connected to said snap-clamp device, said mounting member means being for releasably connecting said snap-clamp device to said body, fastening means connected to said mounting member means, and means associated with said front wall and said compartment for receiving and locking said fastening means, said fastening means being for positioning said mounting member means with said means for receiving and locking and further for positioning said mounting means and said snap-clamp device to said body in a locked position in selected vertical and horizontal alignments of said clamp means, said mounting member means including a mounting member having opposed first and second surfaces and wherein said front wall includes opposed inner and outer surfaces, said first surface being in rotational abutting relationship with said outer surface, said fastening means including a shaft having opposed ends with one of said ends connected to and extending substantially perpendicular from said first surface of said mounting member and two pairs of oppositely positioned locking arms connected to the other of said ends and extending substantially at right angles relative to said shaft, one of said pair of arms being substantially at right angles relative to the other of said pair of arms, said means for receiving and locking including said front wall forming a central passage substantially normal to said inner and outer surfaces and further forming two pairs of oppositely positioned slots normal to said inner and outer surfaces connected to said central passage, said central passage and said slots being adapted to receive said two pairs of arms and said central passage being further adapted to position said shaft, each of said arms including a tapered surface having an edge extending substantially at right angles to said shaft, each said edge being rotationally aligned with the other edges.

2. A clip-on system according to claim 1, wherein said front wall includes wall portions disposed between each of said two pairs of slots, wherein each of said edges extends into said compartment slightly beyond the inner surface of said outer wall and in said locked position said tapered wall is wedged against said inner wall at said wall portions.

3. A clip-on system according to claim 2, wherein said two pairs of arms and said two pairs of slots are aligned vertically and horizontally and said snap-clamp device is aligned at an angle relative to said two pairs of arms prior to positioning said fastening means to said locked position wherein said snap-clamp device is aligned in a selected vertical or horizontal alignment.

4. A clip-on system according to claim 2, wherein said two pairs of arms and said two pairs of slots are aligned at an angle relative to the vertical and horizontal and said snap-clamp device is also aligned at said angle prior to positioning said fastening means to said locked position wherein said snap-clamp device is aligned in a selected vertical or horizontal alignment.

* * * * *